US008459022B2

(12) United States Patent
Cizek (10) Patent No.: US 8,459,022 B2
(45) Date of Patent: Jun. 11, 2013

(54) WASTEGATE PLUG (75) Inventor: Petr Cizek, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 183 days.

(21) Appl. No.: 13/029,755

(22) Filed: Feb. 17, 2011

(65) Prior Publication Data
US 2012/0210709 A1 Aug. 23, 2012

(51) Int. Cl.
F02D 23/00 (2006.01)
F16K 1/16 (2006.01)
F16K 1/22 (2006.01)
F16K 1/34 (2006.01)

(52) U.S. Cl.
USPC ............. 60/602; 251/298; 251/306; 251/210; 251/297

(58) Field of Classification Search
USPC ................. 60/602, 605.1; 251/298, 210, 306, 251/297, 332–333
See application file for complete search history.

(56) References Cited

U.S. PATENT DOCUMENTS

| 1,647,036 | A | * | 10/1927 | Dileo | 251/298 |
| 1,917,000 | A | * | 7/1933 | Tyden | 251/298 |
| 2,701,579 | A | * | 2/1955 | Hasselquist | 251/297 |
| 2,717,001 | A | * | 9/1955 | Perrault | 251/210 |
| 2,805,837 | A | * | 9/1957 | Kessler | 251/298 |
| 2,835,269 | A | * | 5/1958 | Hale | 251/298 |
| 2,919,885 | A | * | 1/1960 | Daigle | 251/298 |
| 3,060,961 | A | | 10/1962 | Conley | |
| 3,102,382 | A | * | 9/1963 | Bozzola | 60/602 |
| 3,144,876 | A | | 8/1964 | Frye | |
| 3,172,424 | A | * | 3/1965 | Stillwagon | 251/298 |
| 3,334,858 | A | * | 8/1967 | Hay | 251/298 |
| 3,376,014 | A | * | 4/1968 | Bucklet et al. | 251/306 |
| 3,379,408 | A | * | 4/1968 | Lowrey | 251/298 |
| 3,522,929 | A | * | 8/1970 | De Simone | 251/298 |
| 3,804,124 | A | * | 4/1974 | Finke et al. | 251/298 |
| 3,841,347 | A | * | 10/1974 | Kushida | 251/172 |
| 4,120,156 | A | | 10/1978 | McInerney | |
| 4,274,436 | A | * | 6/1981 | Smith | 137/515.7 |
| 4,519,579 | A | * | 5/1985 | Brestel et al. | 251/298 |
| 4,730,456 | A | * | 3/1988 | Tadokoro et al. | 60/602 |
| 4,872,480 | A | | 10/1989 | Scaramucci | |
| 5,046,317 | A | | 9/1991 | Satokawa | |
| 5,205,532 | A | * | 4/1993 | Naehring | 251/298 |

(Continued)

FOREIGN PATENT DOCUMENTS
DE 12 56 019 B 12/1967
DE 38 39 968 A1 5/1990

(Continued)

OTHER PUBLICATIONS

Fully certified English Translation of Wimmer et al. (Pub. No. 10 2006 028 800 A1), published on Dec. 27, 2007.*

(Continued)

Primary Examiner — Thai Ba Trieu
(74) Attorney, Agent, or Firm — Brian J. Pangrle (57) ABSTRACT A mono-block arm and plug for closing a wastegate opening includes a shaft portion and a plug portion extending from the shaft portion where the plug portion includes a feature configured to change shape responsive to application of force to close a wastegate opening to enhance sealing of the wastegate opening. Various other examples of devices, assemblies, systems, methods, etc., are also disclosed.

11 Claims, 9 Drawing Sheets

U.S. PATENT DOCUMENTS

| | | | | |
|---|---|---|---|---|
| 5,213,306 | A | * | 5/1993 | Lageder et al. .............. 251/298 |
| 5,876,015 | A | * | 3/1999 | Schaeffer et al. ............ 251/305 |
| 5,996,348 | A | | 12/1999 | Watkins |
| 6,880,572 | B2 | * | 4/2005 | Hartley ......................... 251/298 |
| 8,028,525 | B2 | * | 10/2011 | An et al. ......................... 60/612 |
| 8,205,448 | B2 | * | 6/2012 | Koch et al. .................... 251/298 |

FOREIGN PATENT DOCUMENTS

| | | |
|---|---|---|
| DE | 10 2006 028800 A1 | 12/2007 |
| EP | 1988265 A1 | 10/2008 |
| EP | 1988268 A1 | 10/2008 |
| EP | 2 050 939 A1 | 4/2009 |
| EP | 2 444 626 A1 | 4/2012 |
| JP | 57-137619 A | 8/1982 |
| JP | 62-183033 U | 11/1987 |

OTHER PUBLICATIONS 12 155 476.0-2311 Examination Report EP (Jul. 2, 2012) (2 pages).
12 155 476.0-2311 Search Report EP (May 15, 2012) (2 pages).
EPO Examination Report, Appl. No. 12 155 476.0-2311 Dated Jan. 3, 2013 (4 pages).
EPO Examination Report, Appl. No. 12 155 476.0—2311 Dated Jan. 3, 2013 (4 pages).

* cited by examiner

WASTEGATE PLUG

TECHNICAL FIELD

Subject matter disclosed herein relates generally to turbomachinery for internal combustion engines and, in particular, to wastegate plugs.

BACKGROUND

Many conventional turbine systems require separate wastegate features such as valves and conduits. Accordingly, engine environment or compartment design must account for the turbine system as well as the separate wastegate valve(s) and conduit(s). The disaggregated nature of such components complicates design, especially when one or more additional exhaust conduits are required because consequences of heat carried by exhaust flowing in one or more addition conduit must be considered as well (e.g., additional insulation of conduits, other engine components and reduction of usable engine compartment space). Various turbine housing assemblies with integral wastegate features are presented herein that provide advantages when compared to conventional turbine systems that require separate wastegate features.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
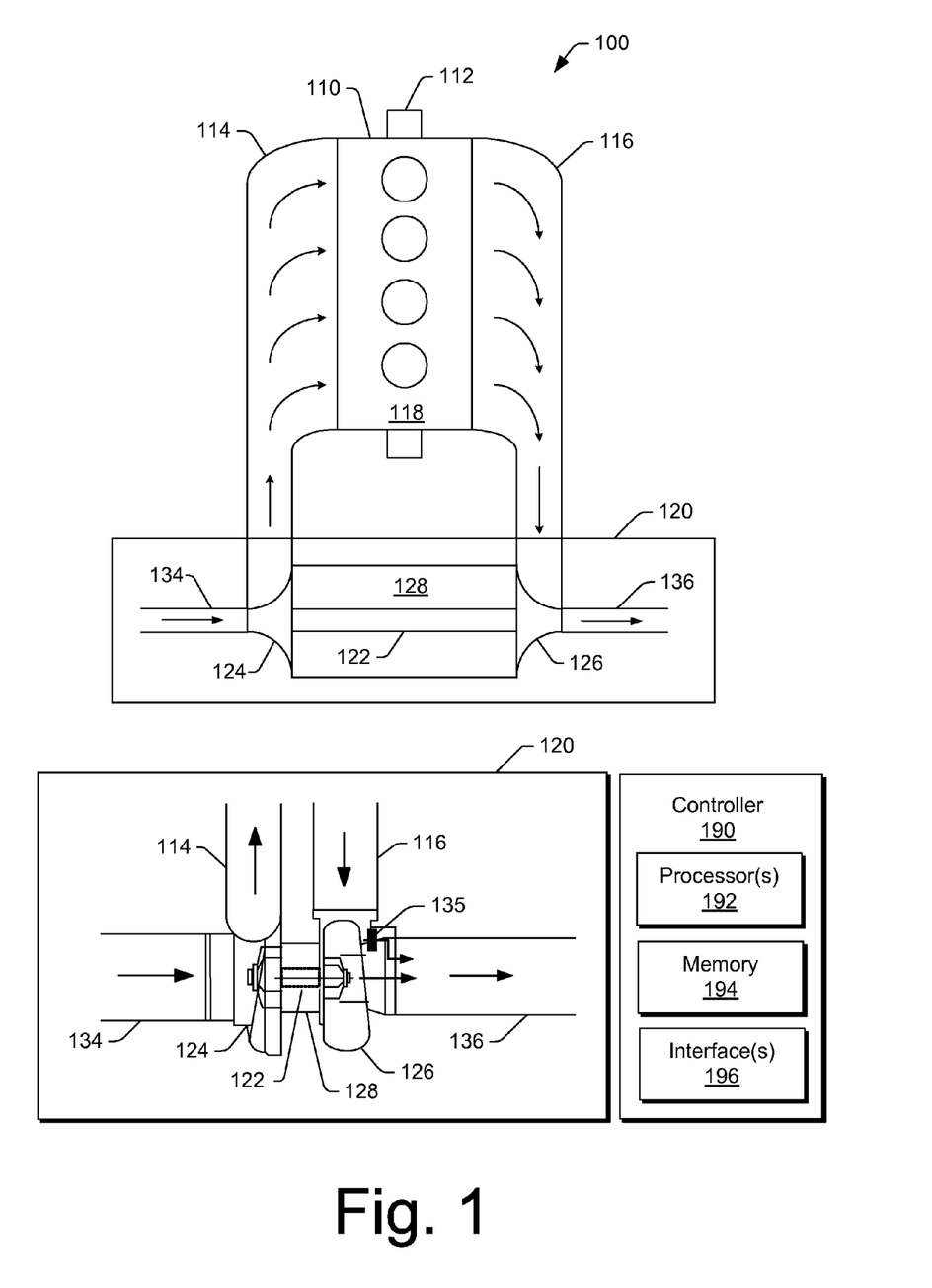
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In the example of FIG. 1, a wastegate valve 135 is positioned proximate to the inlet of the turbine 126. The wastegate valve 135 can be controlled to allow exhaust from the exhaust port 116 to bypass the turbine 126.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions. The controller 190 may be configured to control a variable geometry assembly, a wastegate, an electric motor, or one or more other components associated with an engine, an exhaust turbine (or exhaust turbines), a turbocharger (or turbochargers), etc. With respect to a wastegate, the controller 190 may be configured to act as an actuator or to transmit a signal to an actuator configured to actuate, for example, the wastegate valve 135 (e.g., to close or open a wastegate).

Figure 2:
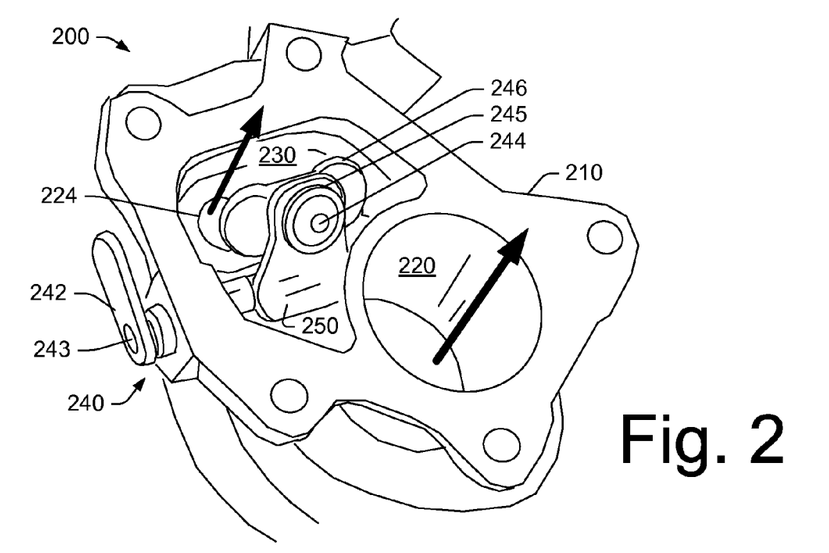
FIG. 2 is a perspective view of an assembly with a wastegate.
Figure 3:
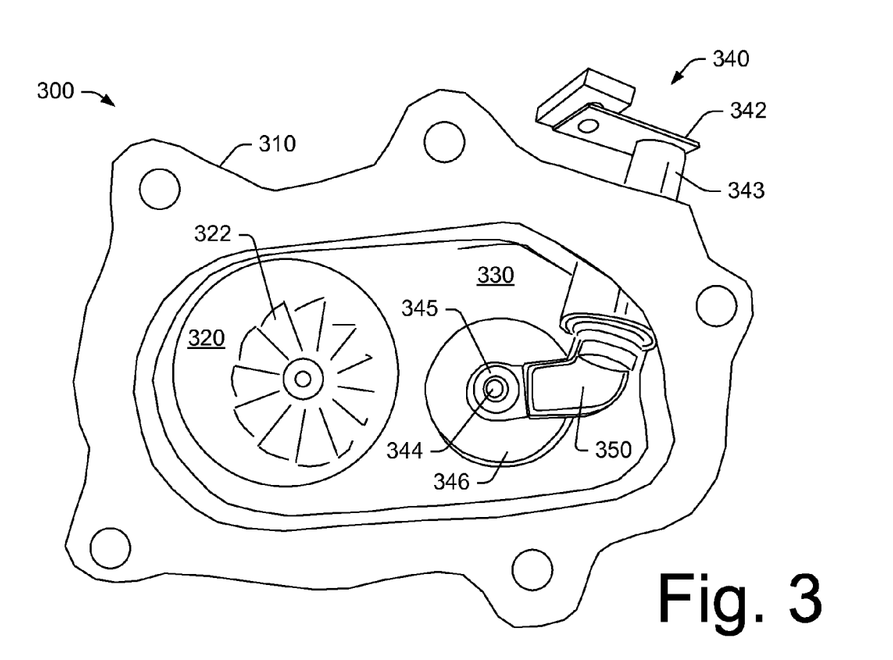
FIG. 3 is a perspective view of an assembly with a wastegate.

FIGS. 2 and 3 show example assemblies 200 and 300, each including a wastegate. The assembly 200 and the assembly 300 each include a housing 210 and 310, an exhaust flow chamber 220 and 320, a wastegate chamber 230 and 330 and a wastegate valve control mechanism 240 and 340. For the assembly 200 of FIG. 2, the exhaust flow chamber 220 is separated from the wastegate chamber 230; whereas, for the assembly 300 of FIG. 3, the chamber 320 joins the wastegate chamber 330. Further, the assembly 300 is shown as including a turbine wheel 322.

The wastegate control mechanism 240 of the assembly 200 includes a control arm 242, a shaft 243, and a poppet arm 250 for moving a plug 246 between a fully closed position and a fully open position. As shown in FIG. 2, the plug 246 is connected and attached to the poppet arm 250 via a peg or stem 244 and washer 245.

The wastegate control mechanism 340 of the assembly 300 includes a control arm 342, a shaft 343, and a poppet arm 350 for moving a plug 346 between a fully closed position and a fully open position. As shown in FIG. 3, the plug 346 is connected and attached to the poppet arm 350 via a peg or stem 344 and washer 345. Further, as shown, the plug 246 of the assembly 200 has a different shape than the plug 346 of the assembly 300.

Figure 4:
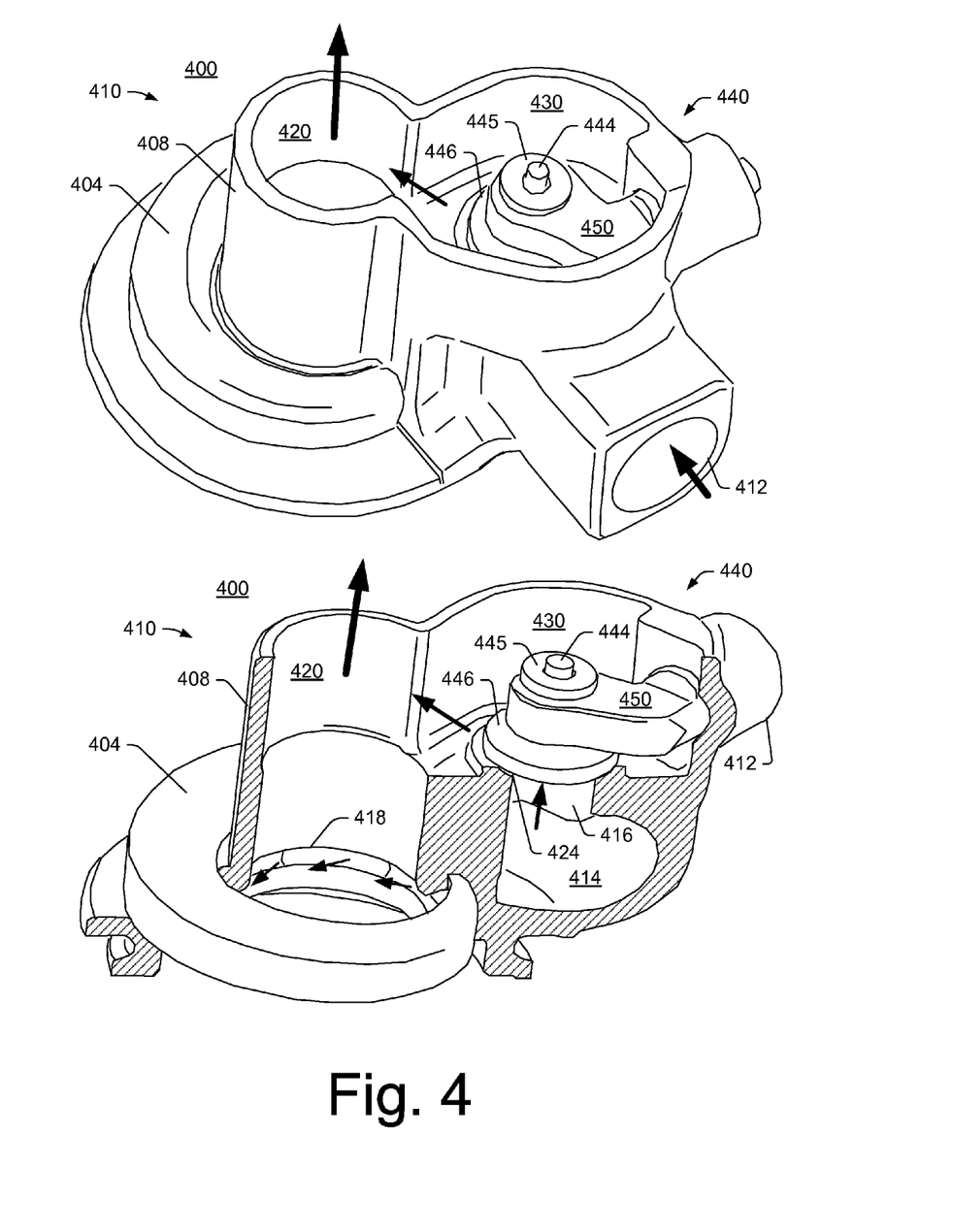
FIG. 4 is a perspective view and a cross-sectional view of an assembly with a wastegate.

FIG. 4 shows a perspective view and a cross-sectional view of an assembly 400 that includes a wastegate. The assembly 400 includes a housing 410, an exhaust flow chamber 420, a wastegate chamber 430 and a wastegate valve control mechanism 440. Also shown in FIG. 4 are a volute wall 404 and a substantially cylindrical housing wall 408, which, at least in part, defines the exhaust flow chamber 420.

The wastegate control mechanism 440 of the assembly 400 includes a poppet arm 450 for moving a plug 446 between a fully closed position and a fully open position. As shown in FIG. 4, the plug 446 is connected and attached to the poppet arm 450 via a peg or stem 444 and washer 445.

The views of FIG. 4 also show the housing 410 as including an exhaust inlet 412, a volute chamber 414 and a passage 416 to a wastegate opening 424 leading to the wastegate chamber 430 as well as an opening 418 to direct exhaust to a turbine wheel (see, e.g., the wheel 322 of FIG. 3).

Regulation of exhaust from the volute chamber 414 to the wastegate chamber 430 occurs via the wastegate control mechanism 440 where the plug 446 is configured to plug the opening 424. The plug 446 is operably connected to the poppet arm 450 such that movement of the poppet arm 450 (e.g., via an actuator) can partially or fully open the opening 424 (i.e., for "waste gating" exhaust). Accordingly, the wastegate control mechanism 440 can control how much exhaust entering the assembly 400 via the inlet 412 is directed to the turbine wheel space via the opening 418. Exhaust flowing through the opening 424 to the wastegate chamber 430 joins the flow of exhaust from the chamber 420. One or more exhaust system components (e.g., of a vehicle) may be connected to an opening or openings of the assembly 400.

Figure 5:
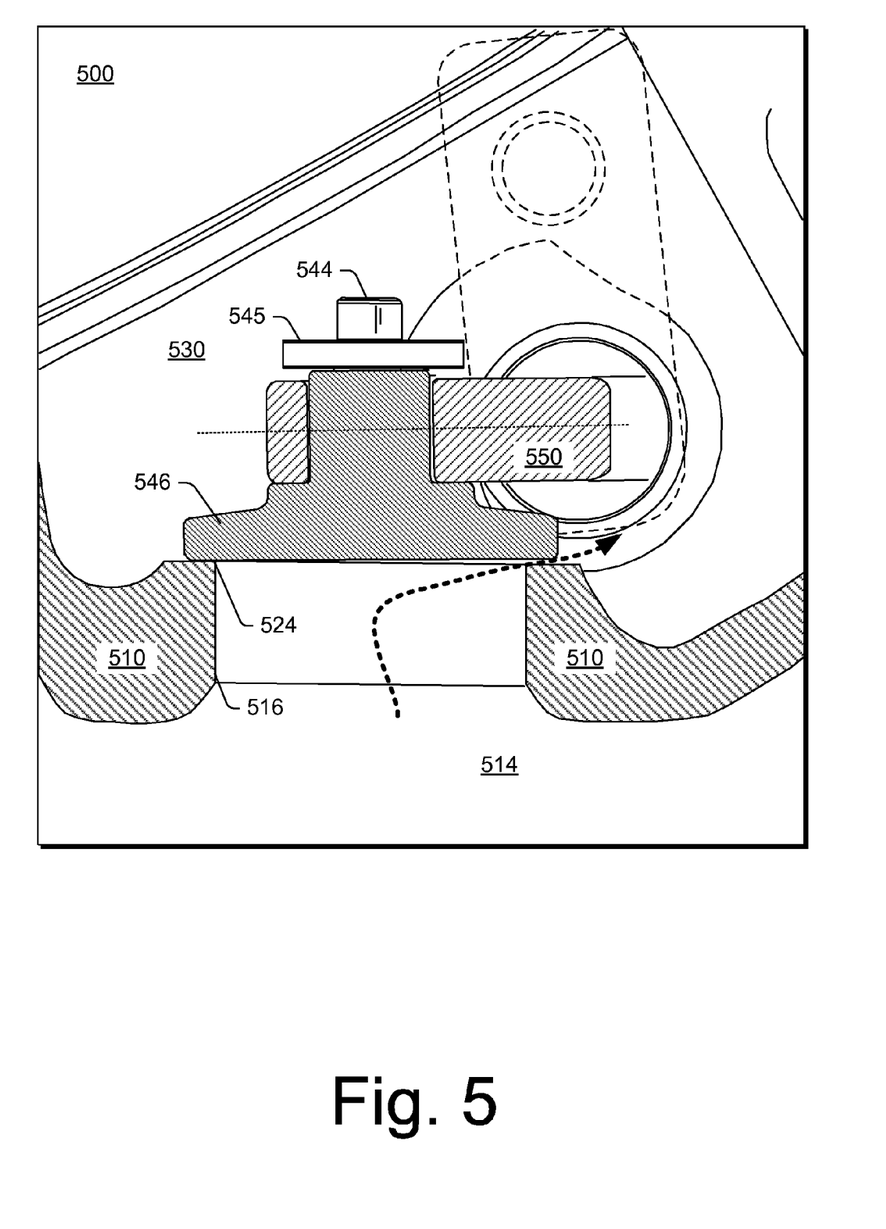
FIG. 5 is a cross-sectional view of an assembly with a wastegate.

FIG. 5 shows a cross-sectional view through a portion of an assembly 500 with a wastegate. Specifically, FIG. 5 shows a housing 510 and a poppet arm 550 configured to receive a plug 546 attached to the poppet arm 550 via a peg or stem 544 and a washer 545. As described herein, various issues can arise during operation, which lead to exhaust leakage from the volute chamber 514 to the wastegate chamber 530 (e.g., via a passage 516 and an opening 524).

As shown in FIG. 5, a flat surface 525 of the housing 510 surrounds the opening 524 and a flat surface 545 of the plug 546 has a perimeter that exceeds the perimeter of the opening 524. To effectively seal the opening 524, a portion of the flat surface 545 of the plug 546 must seat evenly against the flat surface 525 of the housing 510. In other words, to seal the opening 524, the flat surface 545 of the plug 546 must be parallel to and in contact with the flat surface 525 of the housing 510. In practice, misalignment often occurs, as indicated by the gap between the flat surface 545 of the plug 546 and the flat surface 525 of the housing 510 (see arrow representing leakage flow of exhaust). At times, some compensation may occur by clearance between the arm 550 and the plug 546 such that the plug 546 can in its freedom adapt its orientation and lie more effectively on the waste gate seat (e.g., the surface surrounding the opening 524).

As shown in FIGS. 2, 3, 4 and 5, for a variety of reasons, wastegate valves are configured to move a plug attached to an arm by rotating a shaft about its axis. Over time, clearances between the various components (e.g., plug, arm, shaft, shaft bore, bushings, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As described herein, a mono-block arm and plug can enhance sealing of a wastegate opening. In various examples, the plug portion of the block includes a sealing strip. Such a strip may optionally be machined into a face of the plug portion; noting that in some examples, a side or edge of a plug portion may be machined to form a strip (e.g., additionally or alternatively to face machining). In comparison to the multi-component arm and plug example of FIG. 5, a mono block does not offer compensation between an arm with a separate plug attached thereto. As described herein, a mono block arm and plug can include special adaptable features. Such features may be configured for deformation, wear or a combination of deformation and wear to adapt parts together during first time of operation, during latter time of operation, during manufacturing, etc.

As described herein, a sealing strip of a plug can enhance alignment between a wastegate opening and surrounding surface. For example, the sealing strip can be configured to wear in a relatively predetermined manner such that the shape of the plug adapts to a surface associated with a wastegate opening. Such planned adaptation can allow for more effective sealing, whether by at least a portion of the sealing strip being received by the opening, by better alignment between sealing surfaces or a combination of both receipt and alignment.

As described herein, one or more of the following factors may be relied on to achieve planned adaptation of a block arm and plug with respect to an opening (or opening and surrounding surface): material of construction, dimensions, operational force applied to a block arm and plug, repeated opening and closing, etc.

With respect to a material of construction, such a material or materials may be selected that can adapt whether by abrasion, deformation or a combination of deformation and abrasion. The material of construction may apply to a housing that forms a wastegate opening, a block arm and plug or a combination of a housing and a block arm and plug. As described herein, material of construction can include one or more optional treatments (e.g., heat, mechanical or chemical treatments that may help achieve planned adaptation).

With respect to dimensions, a sharp edge may be susceptible to adaptation, a thin sealing strip may be susceptible to adaptation, etc. A plug portion of a block arm and plug may be configured symmetrically or asymmetrically (e.g., with respect to dimensions).

With respect to operational force, mass, acceleration, momentum, etc., may be selected to achieve desired adaptation. As to repeated opening and closing, a control algorithm may cause such repeated opening and closing according to normal operational parameters or according to specialized operational parameters for achieving at least some desired adaptation.

As described herein, a block arm and plug configured for adaptation can reduce exhaust leakage from one chamber to another. As an example of a block arm and plug configured for adaptation, consider a plug with a strip that wears to adapt an edge of the strip to a plane of a wastegate opening (e.g., as defined by a surrounding surface). Such a device can be used to achieve low exhaust leakage. Further, such a device can be manufactured with a high robustness and durability, for example, due to a block design where multi-component clearance issues can be reduced.

As described herein, a plug can include a feature such as a ridge on a face of the plug where the feature is designed to wear down (e.g., ridge adaptation) or dig into the opposing material (e.g., adaptation of another component) to thereby improve a seal over time; noting that in various examples, adaptation may occur for more than one component (e.g., a plug portion feature, a housing feature, etc.). Such approaches can address the fact that an armature pivot point can usually not be placed or oriented perfectly at the outset, and even if located precisely in the beginning it will tend to migrate over time. As an example, a feature can be a ridge, which may optionally be machined into a plug face, but could alternatively or additionally be machined into an opposing face (e.g., a surface of the turbocharger housing that at least partially surrounds a wastegate opening).

As described herein, a plug with a strip can be configured for adaptation (e.g., wear, deformation or a combination of wear and deformation) in a relatively fast manner such that one or more contact surfaces will fit more optimally for closing a wastegate opening. As described herein, a hammering operation (e.g., opening and closing) may be implemented to achieve a change in a plug in a suitable period of time.

A fronting face or surface of a plug may be machined to include a narrow strip. The narrow strip may be intentionally machined with a slightly higher than optimal contact surface, which, in turn, may allow a hammering effect to be accelerated to achieve an acceptable and timely fit between a plug and a wastegate opening or one or more associated surfaces (e.g., surrounding surface, a wall surface, etc.).

As described herein, a mono-block arm and plug may be cast as one part and machined on a shaft portion for insertion into a bushing of a bore of a housing and machined on a flat face of the plug for closing a wastegate. Such a mono-block arrangement can address conventional misalignment issues and reduce risk of leakage or reduce amount of leakage through a bypass opening when in a closed position. Further, for such an example, in a case of an at least slightly opened valve, risk of performance degradation is also reduced. Such an approach to leakage management can be implemented in a manner that also provides for evaluation of operation points of an engine. Further, for engines with high volume exhaust flow through a turbine or turbines, such an approach can be applied to address extreme conditions. Accordingly, for engines with very heavy conditions placed upon an arm and plug, a mono-block approach can be superior to a conventional approach (see, e.g., approach of FIGS. 2, 3, 4 and 5).

In various examples, one or more portions of a mono-block arm and plug can be degraded for engine operational points (e.g., operational conditions) that call for a closed wastegate. Performance may be evaluated, for example, in a case of a small area in an engine map with a closed wastegate.

As described herein, for turbines involving twin scrolls, a conventional plug, as attached to a separate arm, experiences wear due to cycling aerodynamic excitation caused by two streams of hot bypassed exhaust impinging upon the plug. In other words, forces transmitted to a plug component are transmitted from the plug component to one or more other components. Such conventional approaches have been observed to exhibit significant wear on sides of the joint between the separate arm and plug components as well as elsewhere.

Figure 6:
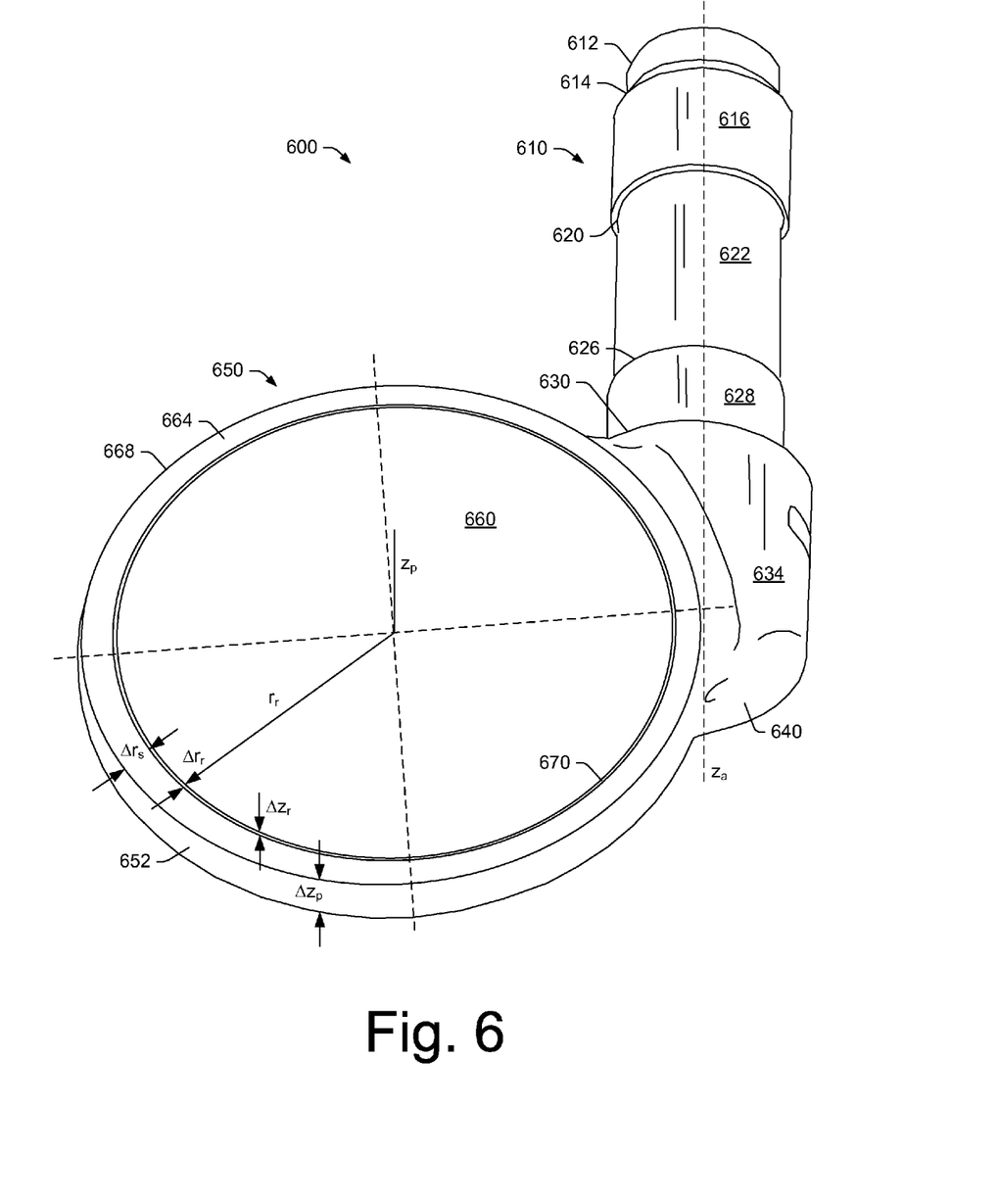
FIG. 6 is a perspective view of an example of a mono-block arm and plug configured to close a wastegate (e.g., a wastegate opening or wastegate passage)

FIG. 6 shows a perspective view of an example of a mono-block arm and plug 600. The arm portion 610 extends from a free end 612 to a plug end 640. As shown in FIG. 6, an axis $z_a$ defines a rotational axis of the arm 610 and the arm 610 includes various surfaces 616, 622, 628 and 634 and shoulders 614, 620, 626 and 630 disposed along the length of the arm 610. The surfaces 616, 622 and 628 are surfaces of a shaft portion of the arm (see, e.g., the shaft 343 of FIG. 3). The plug 650 extends from the arm portion 610 and includes a side surface 652, a face 660 and a ridge 670 extending outwardly from the face 660. The ridge 670 may be disposed at a radius $r_r$ defined from a point on the face 660 and defined by a radial thickness $\Delta r_r$ and a height $\Delta z_r$ along a z-axis $z_p$ of the plug 650. A surface 664 of the plug 650 extends a radial thickness $\Delta r_s$ from the ridge to an edge 668 of the plug 650.

As described herein, the mono-block arm and plug 600 of FIG. 6 may optionally be configured for use in one of the assemblies 200, 300, 400 or 500 shown in FIGS. 2, 3, 4 and 5. For example, a plug portion may include a shape and one or more features to seal the opening 224 of FIG. 2 (e.g., oblong or twin opening).

Figure 7:
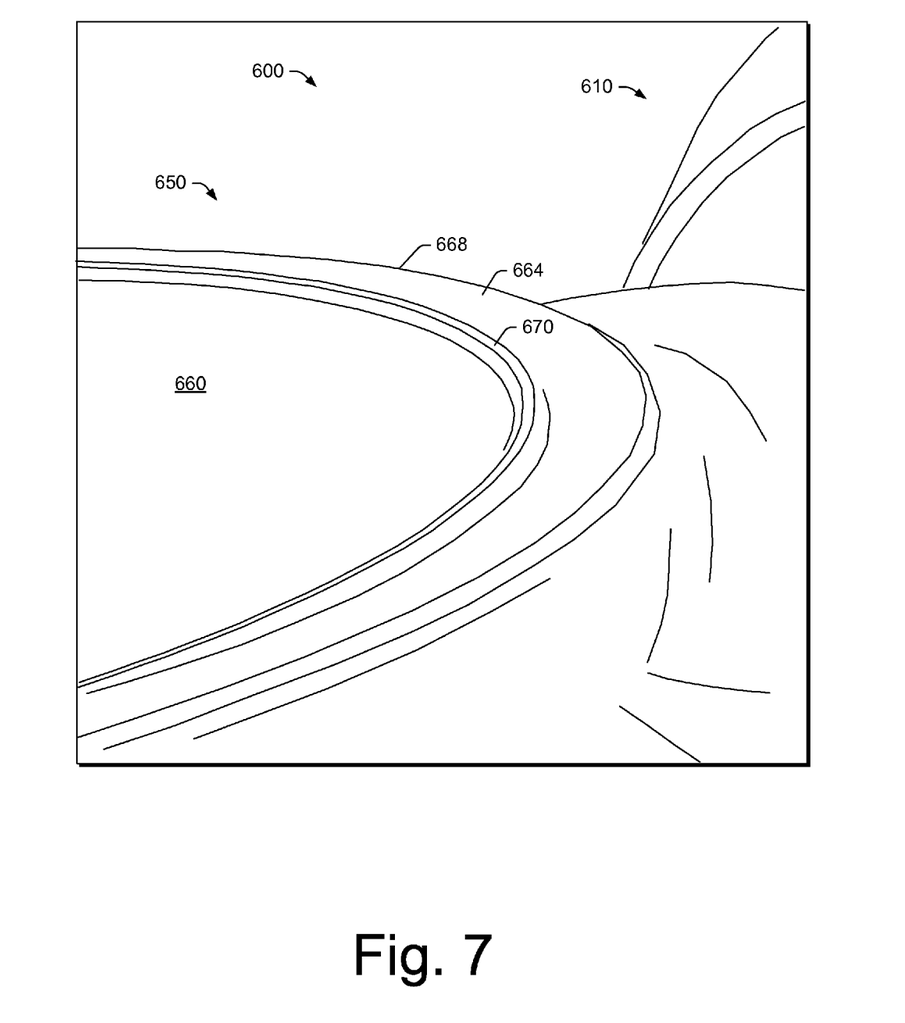
FIG. 7 is a perspective view of the example mono-block arm and plug of FIG. 6.

FIG. 7 shows a perspective view of the mono-block arm and plug 600. In the example of FIG. 7, the plug portion 650 extends from the arm portion 610 and includes a face 660 and a ridge 670 extending outwardly from the face 660 as well as a substantially annular surface 664 disposed between the ridge 670 and the edge 668 of the plug portion 650.

Figure 8:
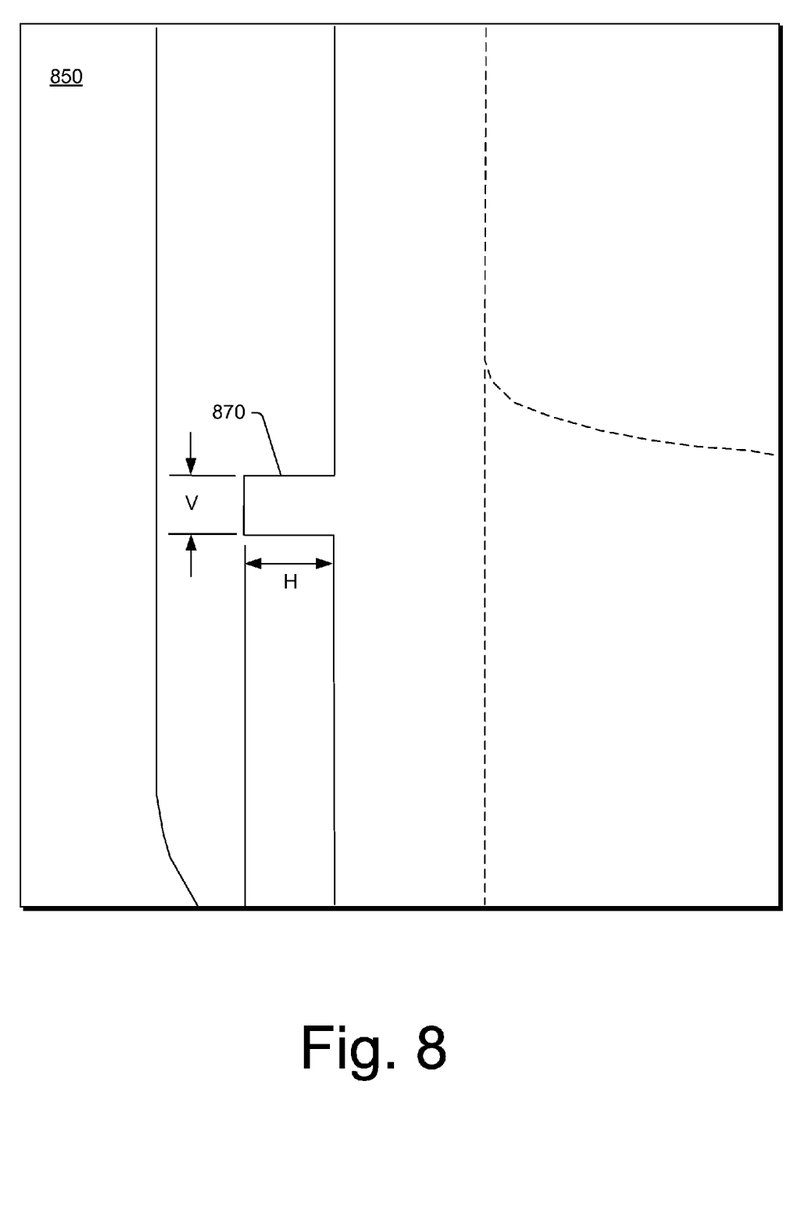
FIG. 8 is a view of a plug portion that includes one or more features configured to change shape responsive to application of force.

FIG. 8 shows a side view of an example of a plug portion 850 of a mono-block arm and plug. In FIG. 8, dimensions H and V are shown for a strip. As described herein, as an example, V/H may be from about 0.2 to about 1. As described herein, dimensions can be determined to allow for desirable deformation, wear, deformation and wear, etc., to enhance sealing. As an example, for a particular material and configuration, one or more dimensions may be on the order of a millimeter or less (e.g., to allow for deformation, wear or deformation and wear).

Figure 9:
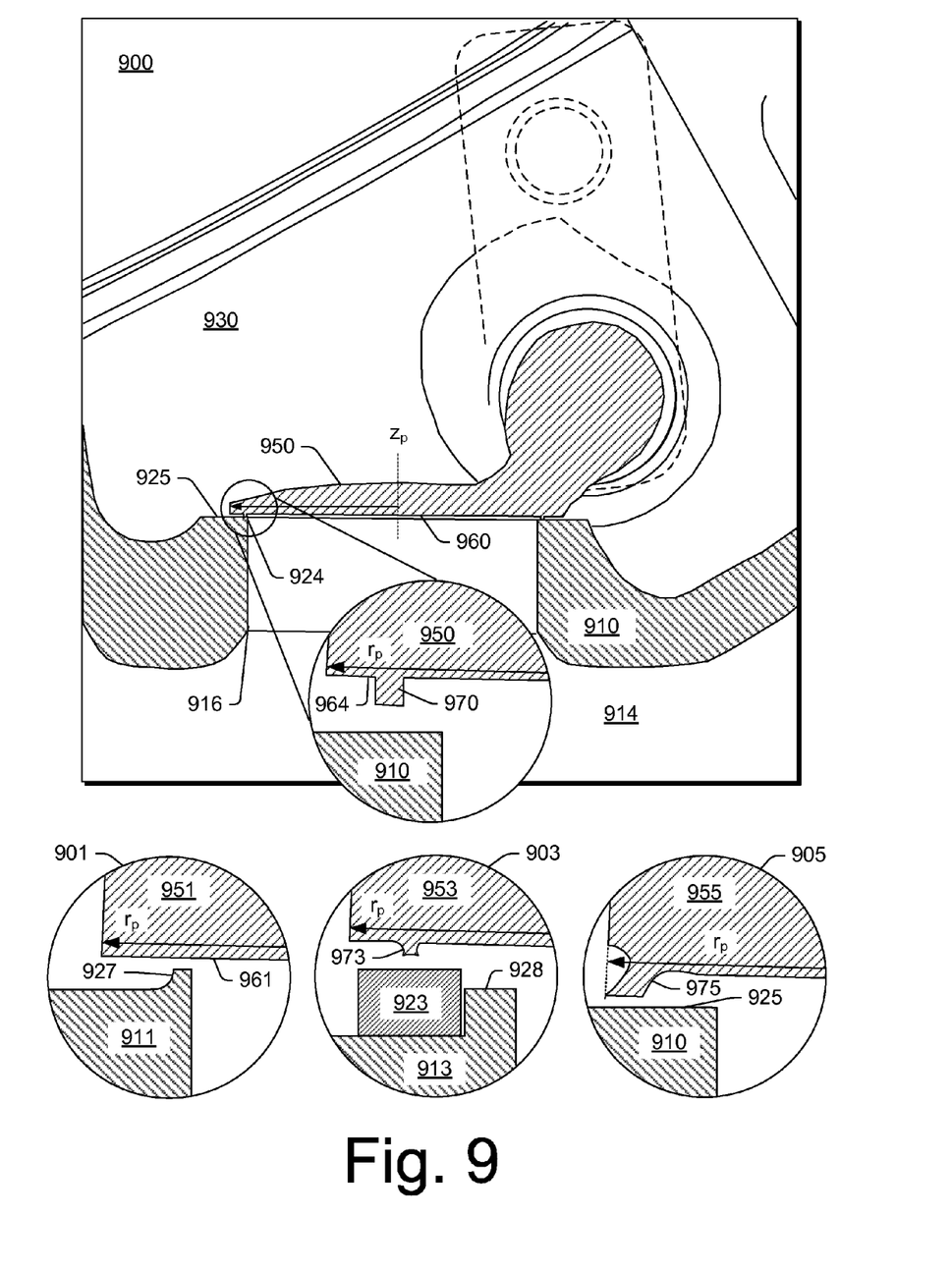
FIG. 9 is a series of cross-sectional views of examples of assemblies that include a mono-block arm and plug.

FIG. 9 shows a cross-sectional view through a portion of an example of an assembly 900 with a feature to enhance sealing of a wastegate opening and cross-sectional views through examples of portions of assemblies 901, 903, and 905 which include some alternative examples of features to enhance sealing of a wastegate opening. In FIG. 9, examples are shown with enlarged views with the plug portion of the mono-block arm and plug open slightly (e.g., rotated about arm/shaft axis) with respect to each of the housings; accordingly, in these examples, a slight angle exists where upon closure a face of a plug portion and a surface of a housing may be expected to be substantially parallel to each other.

The assembly 900 of FIG. 9 includes a housing 910 with an exhaust chamber 914, a wastegate opening 924, a wastegate chamber 930 and a mono-block arm and plug 950 that includes a face 960 and a ridge 970 (e.g., a strip) extending from the face 960. As shown in the example assembly 900 of FIG. 9, a flat surface 925 of the housing 910 surrounds the opening 924 and a flat surface 964 of the arm and plug 950 has a perimeter that exceeds the perimeter of the opening 924. The ridge 970 extends downwardly from the face 960. In a closed position, the ridge 970 contacts the surface 925 that surrounds the opening 924. As described herein, wear, deformation or wear and deformation of the ridge 970 can enhance the ability of the mono-block arm and plug 950 to seal the wastegate opening 924. While the example assembly 900 shows a single ridge 970, a plug may optionally include more than one ridge (e.g., two concentric adaptable ridges configured to contact a housing surface).

The assembly 901 of FIG. 9 includes a plug portion 951 includes a flat face 961 and a housing 911 that includes a relatively small extension 927 configured for contacting the face 961. As described herein, the extension 927 may be configured to wear, deform or otherwise change shape to enhance sealing of a wastegate opening defined by the housing 911. Such an option may be suitable where material of turbine housing (e.g., surrounding the wastegate opening) is softer than that of a plug portion (e.g., of a mono-block arm and plug capable of applying force to an extension).

The assembly 903 of FIG. 9 includes a plug portion 953 that includes a ridge 973 (or strip) and a housing 913 that includes a ring 923 seated adjacent a shoulder 928 (e.g., formed by an extension) where the ridge 973 is configured to contact the ring 923. As described herein, the ridge 973, the ring 923, or the ridge 973 and the ring 923 may be configured to wear, deform or otherwise change shape to enhance sealing of a wastegate opening defined by the housing 913. As described herein, material of construction of the ring 923 may be optionally selected for suitable plasticity to deliver adaptation by wear, deformation or wear and deformation on the ring 923 and not on the ridge 973.

The assembly 905 of FIG. 9 includes a plug portion 955 that includes a ridge 975 (or strip) and the housing 910 with the surface 925. In this example, the ridge 975 forms an angle with the surface 925. For example, the ridge 975 may have a larger radius at point of contact than at the face of the plug portion 955. As described herein, the ridge 975 may be configured to wear, deform or otherwise change shape to enhance sealing of a wastegate opening defined by the housing 915. As indicated in the example of FIG. 9, the feature 975 of the assembly 905 may be located near an edge of the plug portion 955 and optionally machined by machining the edge of the plug portion 955. More specifically, the edge of the plug portion 955 may be disposed at a dimension $r_p$ where a groove (e.g., an annular groove) is formed proximate to or adjacent a corner of the plug portion 955. While the various examples of FIG. 9 are shown with reference to a plug portion perimeter dimension $r_p$, which maybe a radius, other shapes may be possible, for example, where the dimension $r_p$ varies with respect to angle about an axis $z_p$. Accordingly, oval, rectangular, or other shapes may be used for one or more of a plug, a feature of a plug, a feature of a housing, etc., where suitable sealing can be achieved for a wastegate opening, which may have a shape similar to a plug, a feature, etc., or a different shape.

As described herein, various features of the example assemblies 900, 901, 903 and 905 of FIG. 9 may optionally be configured for use in one of the assemblies 200, 300, 400 or 500 shown in FIGS. 2, 3, 4 and 5.

As described herein, a mono-block arm and plug for closing a wastegate opening can include a shaft portion and a plug portion, the plug portion extending from the shaft portion and including a feature configured to change shape responsive to application of force to close a wastegate opening to enhance sealing of the wastegate opening. In such an example, the feature may be a ridge extending outwardly from a face of the plug portion.

As described herein, a mono-block arm and plug can include a plug portion with a plug radius and a ridge extending outwardly from a face of the plug portion where the ridge has a ridge radius and where the plug radius exceeds the ridge radius to define an annular surface disposed between the ridge and a circumference defined by the plug radius. As described herein, a ridge may be a machined ridge, a cast ridge, a cast ridge subsequently machined, etc. A ridge may be defined by a ridge height and a ridge thickness.

As described herein, a mono-block arm and plug optionally includes a recess in a face of a plug portion. Such a recess may optionally be an annular recess. A mono-block arm and plug, as shown in various examples, can include a shaft portion with a free end configured for receipt by a bore of a housing. A shaft portion is typically a straight length of an arm portion. For example, FIG. 6 shows an arm portion with a shaft portion with various surfaces and shoulders. As described herein, rotation of a shaft portion in a bore of a housing provides for positioning of a plug portion to close and open a wastegate opening.

As described herein, an assembly can include a housing that includes an exhaust volute chamber, a wastegate chamber, and a passage configured for flow of exhaust from the exhaust volute chamber to the wastegate chamber. Such an assembly may further include a mono-block arm and plug configured to selectively open or close the passage where the plug portion includes a feature configured to change shape responsive to application of force to close the passage.

As mentioned, a housing may include a bore configured to receive a shaft portion of a mono-block arm and plug. An assembly may further include a controller configured to control rotation of the shaft portion to selectively open or close a passage (e.g., a wastegate passage). Such a controller may include control logic for repeatedly opening and closing the passage by rotation of the shaft portion to change the shape of the feature of the plug portion and control logic for opening or closing the passage by rotation of the shaft portion responsive to one or more engine operating conditions.

Figure 10:
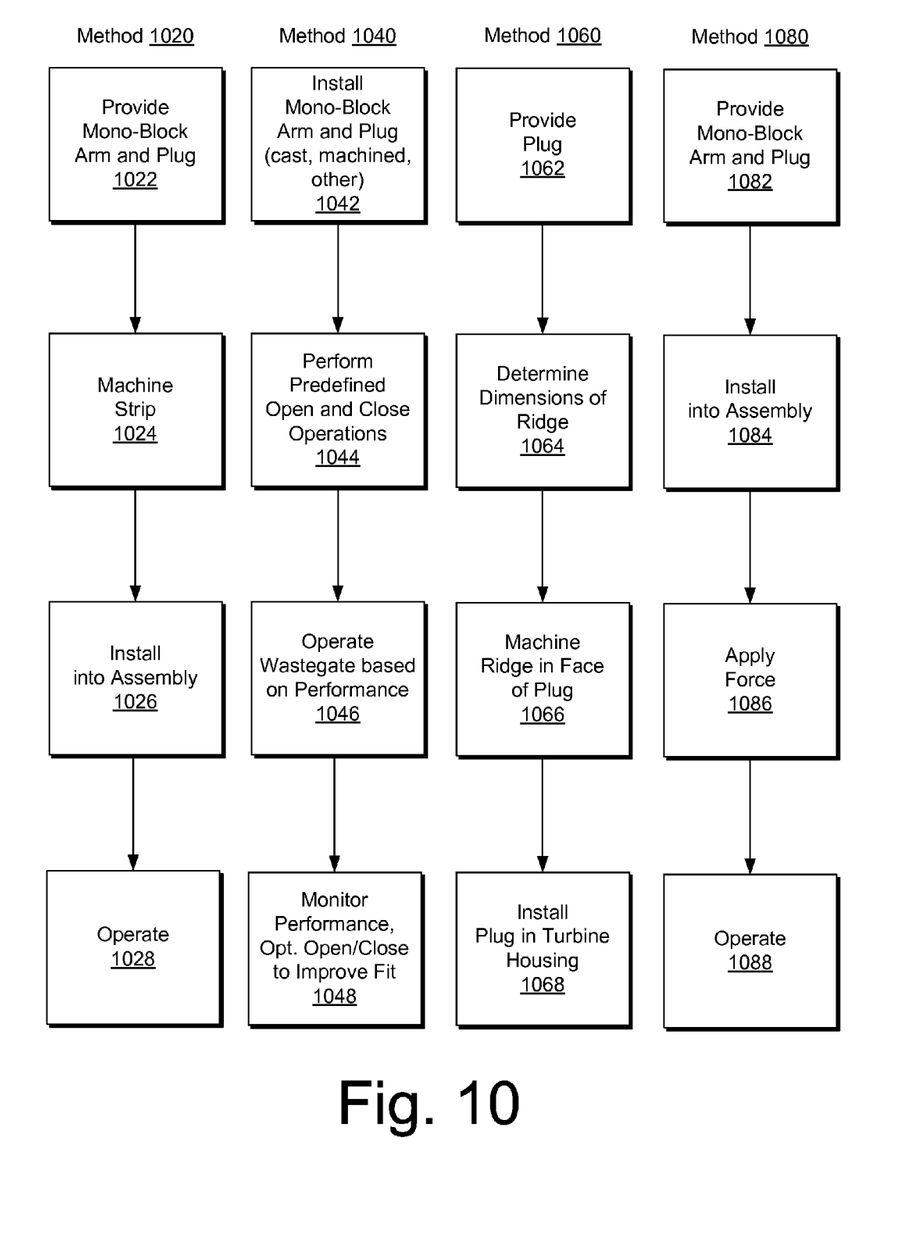
FIG. 10 is a diagram of examples of methods.

FIG. 10 shows examples of three methods 1020, 1040, 1060 and 1080. The method 1020 includes a provision block 1022 for providing a mono-block arm and plug, a machine block 1024 for machining a strip as a seal feature, an installation block 1026 to install the machined mono-block arm and plug into an assembly (e.g., a turbine assembly), and an operation block 1028 for operating the assembly, for example, as part of an exhaust system of an engine.

The method 1040 includes an installation block 1042 for installing a mono-block arm and plug, which may be a cast arm and plug, a machined arm and plug, etc. A performance block 1044 calls for performing predefined open and close or other operations to cause wear, deformation or wear and deformation of the mono-block arm and plug, one or more surfaces of a housing (e.g., that define an exhaust wastegate opening), or a combination of the mono-block arm and plug and one or more surfaces of a housing. An operation block 1046 provides for operating the wastegate, for example, according to performance characteristics (e.g., demand, pressure, temperature, etc.). A monitor block 1048 provides for monitoring performance and optionally calling for opening/closing of the mono-block arm and plug to improve fit and sealing of a wastegate opening.

The method 1060 includes a provision block 1062 for providing a plug, which may be a plug of a mono-block arm and plug. A determination block 1064 of the method 1060 provides for determining dimensions of ridge. A machine block 1066 provides for machining a ridge in a face of the plug. An installation block 1068 provides for installing the plug in a turbine housing.

The method 1080 includes a provision block 1082 for providing a mono-block arm and plug, an installation block 1084 for installing the mono-block arm and plug in an assembly (e.g., a turbine assembly), an application block 1086 that applies force to the mono-block arm and plug (e.g., by hitting the plug portion of the mono-block as part of a manufacturing process prior to shipment), and an operation block for operating the assembly with the mono-block arm and plug.

As described herein, with respect to one or more seal features, a method may include a performance block for performing opening and closing operations to change the shape of at least one of the one or more features of the assembly to enhance sealing of a wastegate opening. For example, a provision block may provide one or more of the features shown in FIG. 9 and a pre-operation block or an operation block may cause at least one of the one or more features to change shape. A feature may change shape through wear, deformation, wear and deformation or other process.

As described herein, a method can include providing an assembly with one or more features configured to change shape responsive to application of force associated with closing a wastegate to enhance sealing of the wastegate; performing one or more closing operations to change shape of at least one of the one or more features to enhance sealing of the wastegate; and calling for opening or closing of the wastegate responsive to one or more engine operating conditions. In such a method, the one or more closing operations can force a plug portion of a mono-block arm and plug against a portion of a housing. For example, a closing operation or operations can deform a ridge (e.g., a ridge of a housing, a ridge of a mono-block arm and plug, etc.).

As described herein, a method can include monitoring one or more engine operating conditions to determine sealing effectiveness of the wastegate and responsive to the monitoring, performing closing operations to further change shape of at least one of the one or more features. In such an example, a closing operation may be a "vibrate" mode closing operation that causes a series of small rotations of a shaft to force two component of an assembly against each other to change shape of a feature or features. As described herein, a closing operation may be a full open to a full close operation performed to generate a maximum amount of force or other desired amount of force to change shape of a feature or features.

As described herein, a mono-block arm and plug for closing a wastegate opening can include a shaft portion and a plug portion extending from the shaft portion where the plug portion includes a feature configured to change shape responsive to application of force to close a wastegate opening to enhance sealing of the wastegate opening.

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein (e.g., one or more acts of the methods 1020, 1040, 1060 and 1080 or other acts). A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit configured to control operation of a wastegate valve (e.g., for purposes of engine performance, adaptation, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A method comprising:
providing a controller and a turbocharger assembly that comprises a compressor and an exhaust turbine to extract energy from exhaust of an internal combustion engine and thereby provide energy via the compressor to intake air to increase performance of the internal combustion engine,
wherein the exhaust turbine comprises:
a housing that comprises:
an exhaust volute chamber,
a wastegate chamber,
a passage that comprises a wastegate opening configured for flow of exhaust from the exhaust volute chamber to the wastegate chamber,
a wastegate seat defined by a surface surrounding the wastegate opening, and
a bore; and
a mono-block arm and plug for closing the wastegate opening wherein the mono-block arm and plug comprises:
an arm portion that comprises a free end configured for receipt by the bore of the housing, a plug end and a shaft portion therebetween having a rotational axis $z_a$, and
a plug portion extending from the arm portion;
wherein the plug portion comprises an outer edge at an outer radius $r_p$, a face and a ridge that comprises a cross-section,
the ridge extending outwardly from the face at a radius $r_r$ defined from a point on the face and defined by a radial thickness $\Delta r_r$ and a height $\Delta z_r$ extending outwardly from the face,
wherein a surface of the plug portion extends a radial distance $\Delta r_s$ from the ridge to the outer edge the plug portion; and
wherein the cross-section is configured to change shape responsive to application of force associated with closing the wastegate opening to enhance sealing of the wastegate opening;
performing a closing operation via the controller to change shape of the ridge by rotating the shaft portion in the bore of the housing to force the ridge against the wastegate seat to enhance sealing of the wastegate opening by the plug portion; and
calling for opening or closing of the wastegate opening via the controller responsive to one or more engine operating conditions wherein opening allows for flow of exhaust from the exhaust volute chamber to the wastegate chamber to reduce extraction of energy from exhaust by the exhaust turbine.

2. The method of claim 1 further comprising monitoring one or more engine operating conditions via the controller to determine sealing effectiveness of the wastegate opening by evaluating performance of the internal combustion engine with respect to an engine map for a closed wastegate and responsive to the monitoring, performing one or more closing operations via the controller to further change shape of the ridge.

3. A mono-block arm and plug for closing a wastegate opening, the mono-block arm and plug comprising:
an arm portion that comprises a free end configured for receipt by a bore of a housing, a plug end and a shaft portion therebetween having a rotational axis $z_a$; and
a plug portion extending from the arm portion,
wherein the plug portion comprising an outer edge at an outer radius $r_p$,
a face and a ridge comprising a cross-section, the ridge extending outwardly from the face at a radius $r_r$ defined from a point on the face and defined by a radial thickness $\Delta r_r$ and a height $\Delta z_r$ extending outwardly from the face,
wherein a surface of the plug portion extends a radial distance $\Delta r_s$ from the ridge to the outer edge of the plug portion; and
wherein the cross-section of ridge of the plug portion is configured to change shape responsive to application of force that rotates the shaft portion in the bore of the housing to position the ridge against a wastegate seat for closing the wastegate opening.

4. The mono-block arm and plug of claim 3 wherein the surface of the plug portion that extends a radial distance $\Delta r_s$ from the ride to the outer edge of the plug portion comprises an annular surface disposed between the ridge and a circumference defined by the plug outer radius $r_p$.

5. The mono-block arm and plug of claim 3 wherein the ridge comprises a machined ridge.

6. The mono-block arm and plug of claim 3 wherein the ridge comprises a cast ridge.

7. The mono-block arm and plug of claim 3 wherein the ridge has a diameter defined by the ridge radius $r_r$.

8. The mono-block arm and plug of claim 3 wherein the ridge, extending outwardly from the face, has an increasing diameter.

9. A turbocharger assembly comprising:
a compressor; and
an exhaust turbine to extract energy from exhaust of an internal combustion engine and thereby provide energy via the compressor to intake air to increase performance of the internal combustion engine,
wherein the exhaust turbine comprises
a housing that comprises
an exhaust volute chamber,
a wastegate chamber,
a passage that comprises a wastegate opening configured for flow of exhaust from the exhaust volute chamber to the wastegate chamber,
a wastegate seat defined by a surface surrounding the wastegate opening, and
a bore; and
a mono-block arm and plug passage for closing the wastegate opening wherein the mono-block arm and plug comprises
an arm portion that comprises a free end configured for receipt by the bore of the housing a plug end and a shaft portion therebetween having a rotational axis $z_a$; and
a plug portion extending from the arm portion,
wherein the plug portion comprising an outer edge at an outer radius $r_p$,
a face and a ridge that comprises a cross-section, the ridge extending outwardly from the face at a radius $r_r$ defined from a point on the face and defined by a radial thickness $\Delta r_r$ and a height $\Delta z_r$ extending outwardly from the face,
wherein a surface of the plug portion extends a radial distance $\Delta r_s$ from the ridge to the outer edge of the plug portion, and
wherein the cross-section of ridge of the plug portion is configured to change shape responsive to application of force that rotates the shaft portion in the bore of the housing to position the ridge against the wastegate seat for closing the wastegate opening.

10. The turbocharger assembly of claim 9 further comprising a controller that rotates the shaft portion to selectively open or close the passage wherein an open passage allows for flow of exhaust from the exhaust volute chamber to the wastegate chamber to reduce extraction of energy from exhaust by the exhaust turbine.

11. The turbocharger assembly of claim 10 wherein the controller comprises control logic for repeatedly opening and closing the passage by rotation of the shaft portion to change the shape of the ridge of the plug portion.

* * * * *